J. & S. FAHRNEY.
Grain-Drill.

No. { 1,594, 32,598. }

Patented June 18, 1861.

Witnesses:
C Breed
W S Crawford

Inventors:
John & Samuel Fahrney
by Attorney Daniel Breed

UNITED STATES PATENT OFFICE.

JOHN FAHRNEY AND SAMUEL FAHRNEY, OF WASHINGTON COUNTY, MD.

IMPROVEMENT IN SEED-DRILLS.

Specification forming part of Letters Patent No. 32,598, dated June 18, 1861.

*To all whom it may concern:*

Be it known that we, JOHN FAHRNEY and SAMUEL FAHRNEY, of the county of Washington and State of Maryland, have invented a new and useful Improvement in Seed-Drills; and we do hereby declare that the following is a full and exact description thereof, reference being had to the accompanying drawings, and to the letters of reference marked thereon.

Our invention consists mainly in a set of levers so arranged as to give a flexible bearing to regulate the pressure upon the openers in seed-drills and keep the said openers at a suitable depth in the ground, whether the soil be hard or light.

The general arrangement of the frame, running-gear, seed-box, and seed tubes or openers of my machine may be made as shown in the accompanying drawings; or they may be of any other suitable form.

Figure 1:
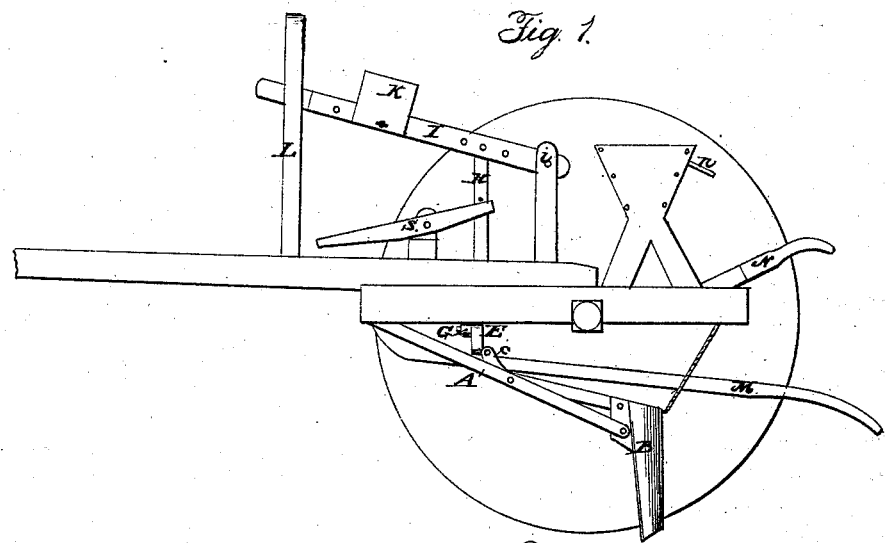
Figure 2:
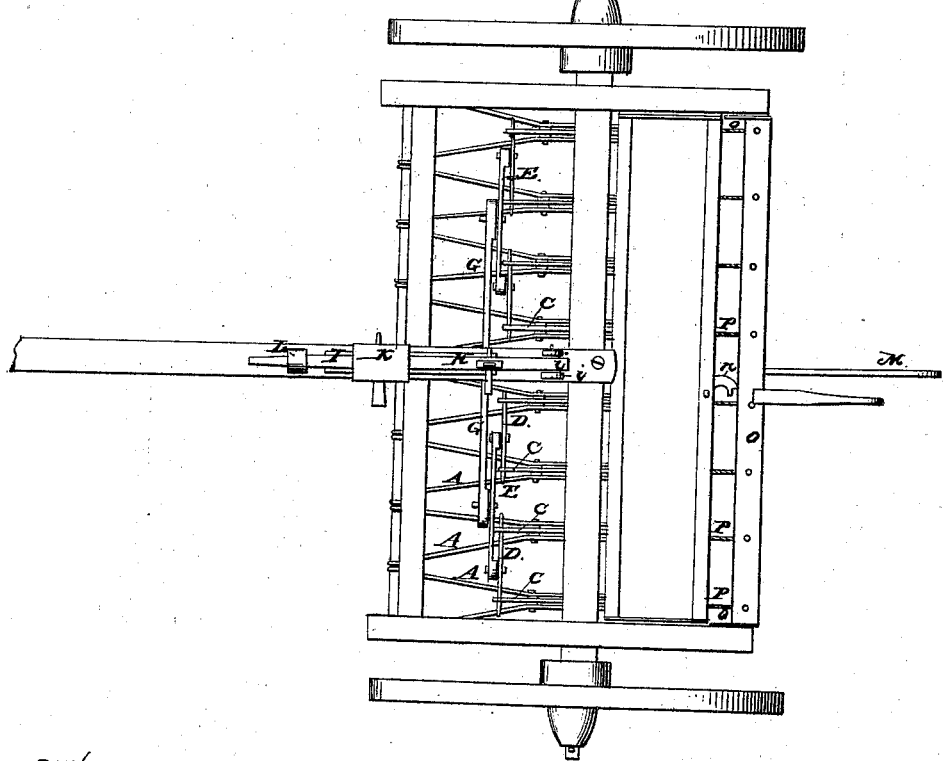

The bars A are hinged at their forward ends to the frame of the machine, there being two of these bars connected with each tube or opener B. Between the two bars A, attached to the same drill-tube, is a brace, C, the forward end of which is also hinged to one of the short levers D, Fig. 2. These levers D are pivoted at their center to the ends of a second set of levers, E, which in turn are pivoted to the ends of the long lever. Thus the braces C, and through them the drill tubes or openers, are all united together by the series of levers D, E, and G, forming a flexible connection or lever, which will allow any drill-tube to rise or fall to a certain extent somewhat independently of all the other drill-tubes. The main lever G is attached to the rod H, which extends upward and is connected with the weighted lever, provided with an adjustable weight, K. This lever I has its fulcrum at the pivot *i*, and the other end of the same plays freely up and down in a slot in the standard L. By this arrangement the weight K presses the drill-tubes into the ground, and yet leaves each tube comparatively free to rise in passing obstructions without taking upon itself too much weight, which increased weight might be liable to break the machine. The lever G is also connected with the hand-lever M, the forward end of which is pivoted to the frame of the machine, so that the tender in following the machine may, with his hand on the lever M, press the drill-tubes into the ground with any desired force or lift said tubes at pleasure.

When the machine travels from field to field the lever N may be turned up and fastened by hook *n*, thus raising the bar upon the long hinges *o*, and by means of cords P elevating the drill-tubes until they ride clear of the ground. The weight is made adjustable upon lever I, so as to increase or diminish the pressure upon the drill-tubes or openers. By placing the foot on the lever S the driver can raise the seed-tubes at pleasure.

Having thus fully described our invention, what we claim, and desire to secure by Letters Patent of the United States, is—

1. The set of levers D, E, and G, forming a flexible lever or system of levers, for the purpose of regulating the pressure upon the drill tubes or openers, substantially as set forth.

2. The arrangement of the weighted lever I and the lever S, substantially in the manner and for the purposes specified.

JOHN FAHRNEY.
SAML. FAHRNEY.

Witnesses:
ADAM DEVELBISS,
ADOLPHUS DEVILBISS.